US008863713B2

(12) United States Patent
Schafer et al.

(10) Patent No.: US 8,863,713 B2
(45) Date of Patent: Oct. 21, 2014

(54) CAMSHAFT ADJUSTER HAVING A NON-RETURN VALVE

(71) Applicant: Schaeffler Technologies AG & Co. KG, Herzogenaurach (DE)

(72) Inventors: Jens Schafer, Herzogenaurach (DE); Martin Steigerwald, Herzogenaurach (DE); Michael Busse, Herzogenaurach (DE); Jurgen Plate, Gerhardshofen (DE); Andreas Wedel, Emskirchen (DE); Olaf Boese, Nuremberg (DE); Steffen Racklebe, Obermichelbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/751,283

(22) Filed: Jan. 28, 2013

(65) Prior Publication Data
US 2013/0199477 A1    Aug. 8, 2013

(30) Foreign Application Priority Data
Feb. 2, 2012    (DE) .......................... 10 2012 201 556

(51) Int. Cl.
*F01L 1/34*    (2006.01)
*F16K 15/16*    (2006.01)
*F01L 1/344*    (2006.01)

(52) U.S. Cl.
CPC ....... *F01L 1/344* (2013.01); *F01L 2001/34433* (2013.01); *F01L 2001/34479* (2013.01); *F01L 1/3442* (2013.01); *F16K 15/16* (2013.01); *F01L 2001/34446* (2013.01)
USPC ..................................... 123/90.17; 123/90.15

(58) Field of Classification Search
CPC .................. F01L 1/3442; F01L 2001/34446; F01L 1/34423
USPC ................................ 123/90.15, 90.17, 90.31
See application file for complete search history.

(56) References Cited

U.S. PATENT DOCUMENTS

2006/0237078 A1    10/2006    Luvisotto et al.
2010/0120564 A1*    5/2010    Hartmann et al. ............. 474/110
2013/0025553 A1*    1/2013    Busse et al. ................. 123/90.17

FOREIGN PATENT DOCUMENTS

WO    2011138136    11/2011

* cited by examiner

*Primary Examiner* — Zelalem Eshete
(74) *Attorney, Agent, or Firm* — Volpe and Koenig, P.C.

(57) ABSTRACT

A camshaft adjustor (4), for an internal combustion engine (2), the camshaft adjustor having a stator (20), a rotor (22) which is rotatably accommodated in the stator (20), a pressure chamber (44) for adjusting the rotor (22) in relation to the stator (20) and a volume reservoir (70) for equalizing a negative pressure in the pressure chamber (44) via a channel (88) between the pressure chamber (44) and the volume reservoir (70). A non-return valve (72) having a closure part (102) for blocking a channel (88) which opens a volume reservoir (70) into a pressure chamber (44) in a camshaft adjustor (4), wherein the non-return valve (72) is formed of a metal sheet and the closure part (102) is realized so as to be movable in a recess (98) of the metal sheet (92) with two oppositely situated ends (94, 96) which are bent toward each other.

4 Claims, 6 Drawing Sheets ary
CAMSHAFT ADJUSTER HAVING A NON-RETURN VALVE

INCORPORATION BY REFERENCE

The following documents are incorporated herein by reference as if fully set forth: German Patent Application No.: DE 102012201556.6, filed Feb. 2, 2012.

FIELD OF THE INVENTION

The invention relates to a camshaft adjustor having a non-return valve.

BACKGROUND

Camshaft adjustors are technical assemblies for adjusting the phase positions between a crankshaft and a camshaft in an internal combustion engine.

It is known from WO 2011 138 136 A1 to arrange a volume reservoir in a camshaft adjustor, it being possible to suck hydraulic fluid from the pressure chambers out of said volume reservoir in the event of a negative pressure.

SUMMARY

It is the object of the invention to improve the known camshaft adjustor.

This is achieved through a camshaft adjustor with one or more features of the invention. Preferred further developments are described below and in the claims.

The invention provides a camshaft adjustor for an internal combustion engine, said camshaft adjustor including a stator, a rotor which is rotatably accommodated in the stator, a pressure chamber for adjusting the rotor in relation to the stator and a volume reservoir for equalizing a negative pressure in the pressure chamber via a channel between the pressure chamber and the volume reservoir.

According to the invention, the non-return valve of the camshaft adjustor of the aforementioned type has a closure part which is held in a recess of a metal sheet by way of two oppositely situated ends which are bent toward each other. The closure part, for example together with the recess, can be punched out of the metal sheet or can be cut out in some other manner. The oppositely situated ends of the metal sheet can be bent toward each other subsequently, or where applicable, beforehand. In this way, the non-return valve is able to be produced economically in a particularly favourable manner by means of a pressing operation.

The invention consequently provides a non-return valve having a closure part for blocking a channel which opens a volume reservoir into a pressure chamber in a camshaft adjustor, the closure part being realized so as to be movable at one end of a flectional beam which can be connected to the camshaft adjustor. According to the invention, the flectional beam is bent at least once in the non-loaded state.

In a further development of the invention, at least one of the bent ends of the metal sheet covers the closure part at least in part. In this way, a stop for the non-return valve, which limits the lift thereof and in this way protects the non-return valve from over-extension, can be incorporated into the metal sheet and can be technically re-positioned without an extra production step.

The invention also provides a rotor for a camshaft adjustor which includes a hub and at least one vane with a channel, said vane projecting radially from the hub and said channel opening a volume reservoir in the camshaft adjustor into a pressure chamber of the camshaft adjustor. According to the invention, on the pressure chamber side, the vane has a groove into which the channel is guided and which is provided for accommodating a specified non-return valve.

The invention also provides a stator for a camshaft adjustor which includes a ring-shaped outer part and at least one vane-shaped segment with a channel, said vane-shaped segment protruding radially inward from the ring-shaped outer part and said channel opening a volume reservoir in the camshaft adjustor into a pressure chamber of the camshaft adjustor. According to the invention, on the pressure chamber side, the segment has a groove, into which the channel is guided and which is provided for accommodating a specified non-return valve.

According to the invention, the rotor and/or the stator can be realized according to a specified rotor and/or stator, a specified non-return valve being accommodated in a corresponding manner in the groove.

BRIEF DESCRIPTION OF THE DRAWINGS

Exemplary embodiments of the invention are explained below by way of a drawing, in which, in detail.

DETAILED DESCRIPTION OF THE PREFERRED EMBODIMENTS

Identical elements are provided with identical references in the figures and are only described once.

Figure 1:
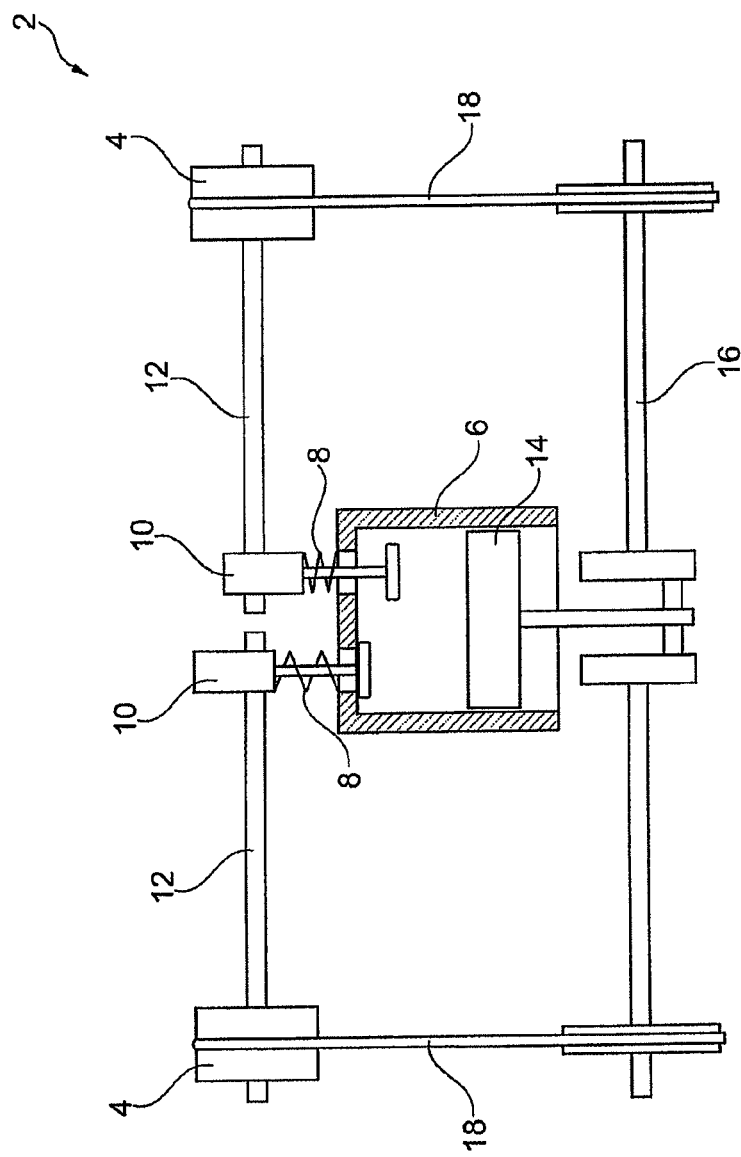
FIG. 1 shows a schematic representation of an internal combustion engine with camshaft adjustors.

Reference is made to FIG. 1 which shows a schematic representation of an internal combustion engine 2 with camshaft adjustors 4.

The internal combustion engine 2 includes, in a manner that is known per se, a combustion chamber 6, which can be opened and closed by valves 8. The valves are actuated by cams 10 on corresponding camshafts 12. A lifting piston 14, which drives a crankshaft 16, is additionally accommodated in the combustion chamber 6. The rotational energy of the crankshaft 16 is transferred at the axial end thereof to the camshaft adjustor 4 by a drive arragnement 18. In the present example, the drive element can be a chain or a belt.

The camshaft adjustors 4 are placed axially in each case onto one of the camshafts 12, take up the rotational energy of the drive element 18 and output it to the camshafts 12. In this case, the camshaft adjustors 4 can retard or advance in time the rotation of the camshafts 12 in relation to the crankshaft 14 in order to modify the phase position of the camshafts 12 in relation to the crankshaft 16.

Figure 2:
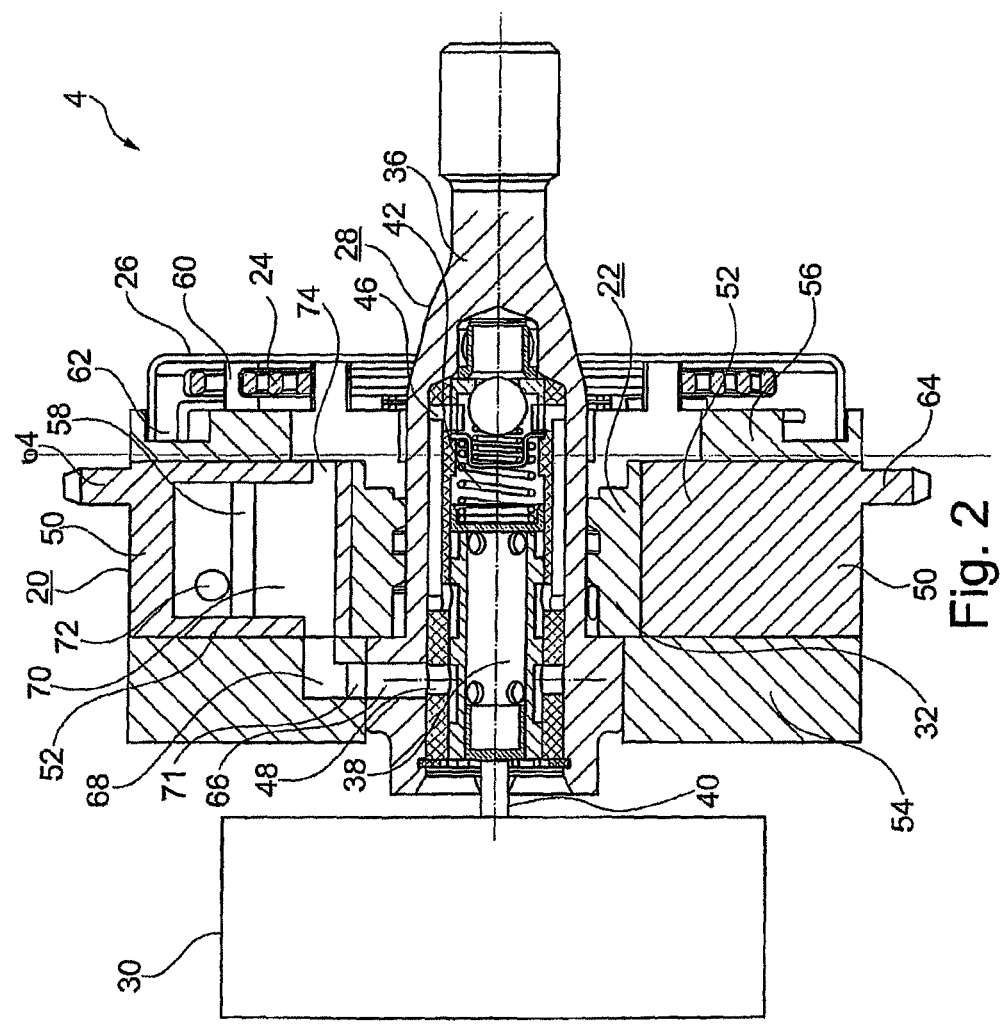
FIG. 2 shows a sectional view of a camshaft adjustor from FIG. 1 with a stator.

Reference is made to FIG. 2 which shows a sectional view of one of the camshaft adjustors 4 from FIG. 1 with a stator 20.

Along with the stator 20, the camshaft adjustor 4 has a rotor 22 which is accommodated in the stator 20, a helical spring 24 which prestresses the stator 20 in relation to the rotor 22, a spring cover 26 which covers the helical spring, a central valve 28 which is accommodated centrally in the camshaft adjustor 4 and a central solenoid 30 which actuates the central valve 28.

Figure 3:
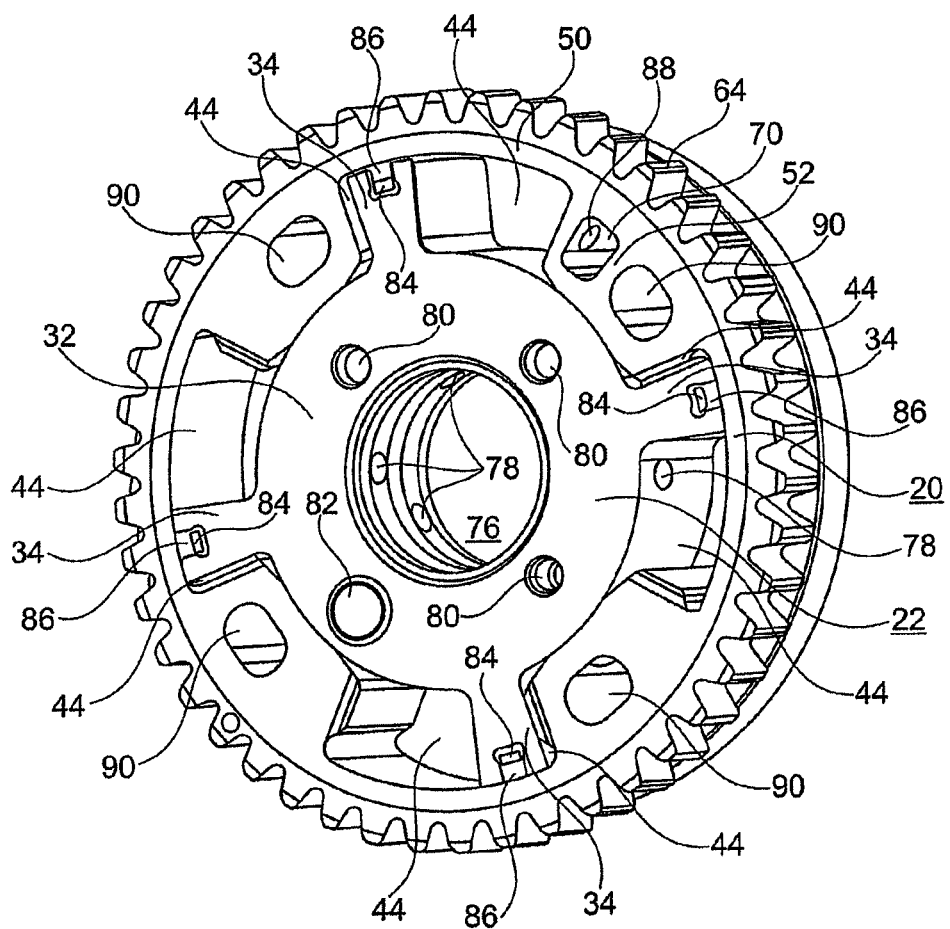
FIG. 3 shows a three-dimensional representation of a stator from FIG. 2.
Figure 4:
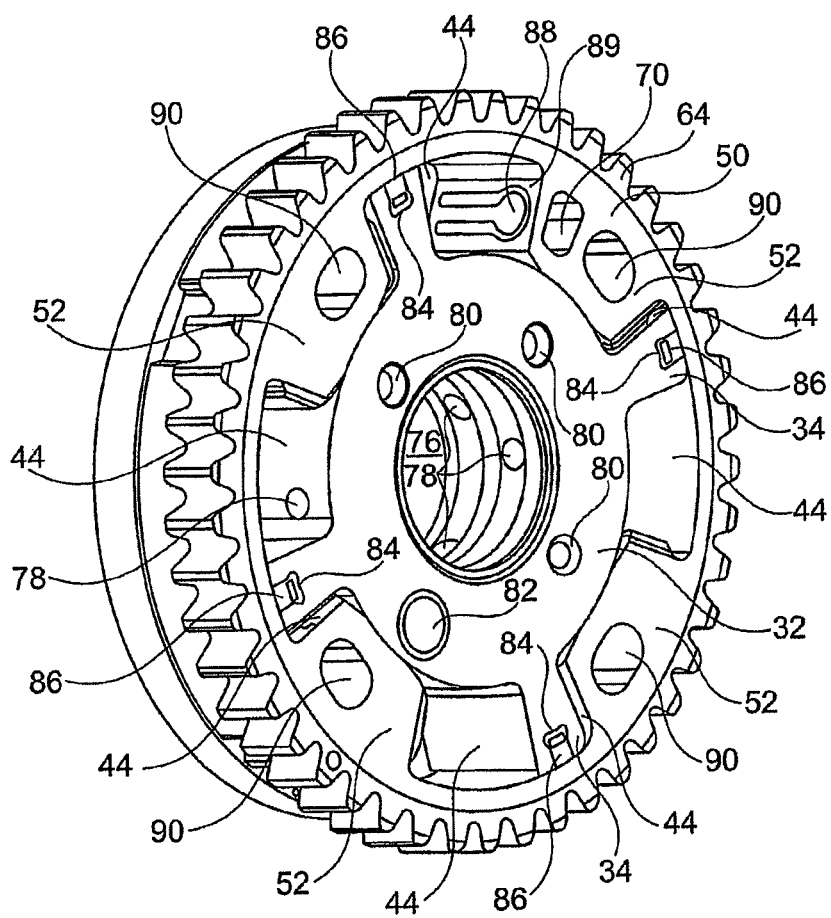
FIG. 4 shows another perspective of a three-dimensional representation of the stator from FIG. 3.
Figure 5:
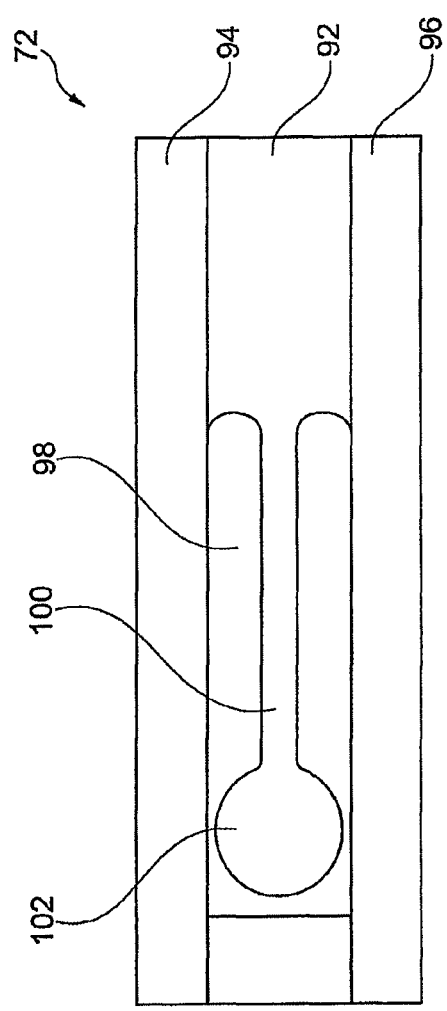
FIG. 5 shows an exemplary embodiment of the non-return valve from FIGS. 3 and 4.

The rotor 22 is accommodated in a concentric manner in the stator 20 and has vanes 34 which are shown in FIGS. 3 to 5 projecting from a hub 32 of the rotor. The rotor 22 is held in a concentric manner on a central screw 36 of the central valve 28, which can be screwed into one of the camshafts 12 and in which a control piston 38 is accommodated so as to be axially movable, it being possible to move said control piston axially into the central screw 36 by a plunger 40 of the central solenoid and to press it axially out of the central screw 36 by a spring 42. Depending on the position of the control piston 38 in the central screw 36, pressure chambers 44 of the camshaft adjustor 4, shown in FIGS. 3 and 4, are connected in a manner that is known per se to a pressure connection 46 or to a volume reservoir connection 48, by which, in a corresponding manner, a hydraulic fluid can be pumped into the pressure chambers 44 or can be drained out of said pressure chambers.

The stator 20 has a ring-shaped outer part 50 which can be seen easily in FIGS. 3 and 4, from which ring-shaped outer part four segments 52 project radially inward. The ring-shaped outer part 50 is closed in an axial manner by way of a front cover 54 and a rear cover 56, the covers 54, 56 being held on the ring-shaped outer part 50 by screws 58. One of the screws 58 has an axial extension 60 which serves as an attachment for the helical spring 24. In addition, a circumferential groove 62, in which the spring cover 26 is clamped, is realized in the rear cover 56 on the axial side situated opposite the ring-shaped outer part 50. Teeth 64, in which the drive element 18 can engage, are realized on the radial circumference of the ring-shaped outer part 50.

The central screw 36 has, as a volume reservoir connection 48, a radial bore 66 on which an axial channel 68 through the front cover 54 is placed. The channel 68 is placed radially onto a groove 71, which is guided in the circumferential direction, on the radial inside of the front cover 54 which is directed to the central screw 36 in order to allow a flow of hydraulic fluid in any position of the central screw 36, which is connected non-rotatably to the rotor 22, to the stator 20 between the radial bore 66 and the channel 68.

The channel 68 leads into a cavity 70 in one of the segments 52, one of the screws 58 also being guided through said cavity 70. The cavity 70 is opened with respect to the adjacent pressure chamber 44 of the camshaft adjustor 4 via a non-return valve 72, the flow of hydraulic fluid being possible exclusively from the cavity 70 to the pressure chamber 44 such that the pressure chamber 44 is able to draw up hydraulic fluid stored in the cavity 70 in the event of negative pressure. If the cavity 70 overflows with too much hydraulic fluid, the surplus of hydraulic fluid is output by a tank connection 74 for example to an oil sump (not shown). The cavity 70 in the segment 52, in this case, serves as a volume reservoir for equalizing a negative pressure in the corresponding adjoining pressure chamber 44 of the camshaft adjustor 4.

Reference is made to FIGS. 3 and 4 which show two different perspectives of a three-dimensional representation of the stator 20 with a rotor 22 from FIG. 2 accommodated therein.

The rotor 22 has in the center an axial passage 76 into which the central valve 28 can be inserted. Radial bores 78, which can be connected to the operating connections of the central valve 28, extend out of the axial passage 76 in order to fill or to empty the pressure chambers 44 with or of hydraulic fluid. Further axial through-bores 80 for accommodating pins (not shown) are guided radially offset from the axial passage 76, on which the helical spring 24 can be suspended on the rotor side. In addition, the rotor 22 includes, radially offset from the axial passage 76, an axial blind hole bore 82, in which a locking pin (not shown) for locking the rotor 22 in relation to the stator 20 can be accommodated. The radial ends of the vanes of the rotor 22 have radial notches 84, in which in each case a seal 86 is accommodated for sealing the pressure chambers 44 from each other.

As can be seen in FIGS. 3 and 4, the vanes 34, circumferentially on an inner surface of the ring-shaped outer part 50, engage in spaces defined by the segments 52 and thus form the pressure chambers 44. When viewed in the circumferential direction of the stator 20, in this case, an advance pressure chamber 44 is realized in front of a vane 34, whilst a retarded pressure chamber 44 is realized behind a vane 34. In the present embodiment only one of the advance pressure chambers 44 is connected via a non-return valve 72 to a cavity 70 for equalizing the pressure. However, it is also possible for all the advance pressure chambers 44 or all the retarded pressure chambers 44 to be connected via non-return valves to a cavity 70 which is correspondingly realized in the segments 52 for pressure equalization.

In FIGS. 3 and 4, a bore 88, which connects the cavity 70 to the pressure chamber 44, is guided in the circumferential direction of the stator 22 out of the cavity 70 into the correspondingly adjoining pressure chamber 44. The bore 88 leads into a groove 89 in which the non-return valve 72 is accommodated. More details of the groove 89 will be provided below. On the side of the pressure chamber, the non-return valve 72 is arranged in the form of a small plate which, in the case of a flow of hydraulic fluid from the pressure chamber 44 into the cavity 70, presses onto the stator 20 and thus closes the bore 88. In the present design, the pressure chambers 44 and the cavity 70 are connected together by one single bore 88. Both chambers 44, 70, however, can be connected together by several bores 88 and by correspondingly several non-return valves 72. It is also possible to arrange several non-return valves 72 in series and/or parallel in one single bore 88.

In addition, axially continuous recesses 90, through which the screws 58 can be guided, are guided in each case through the segments 52.

In FIGS. 3 and 4, the cavity 70, serving as a volume reservoir, is realized in an exemplary manner in the stator 20. The cavity, however, can be realized at any arbitrary position in the camshaft adjustor 4. Thus, the cavity 70, as shown subsequently, can be realized in the rotor 22 or, if a vane 34 is omitted between two segments 52 of the stator 20, also between both of said two segments 52.

The non-return valve 72 is placed onto the stator 20 in FIGS. 3 and 4. Depending on where the cavity 70 is realized, the non-return valve 72 can also be placed on the rotor 22.

Reference is made to FIG. 5 which shows an exemplary embodiment of the non-return valve 72.

The non-return valve 72, in the present design, is formed of a metal sheet 92. When viewed into the drawing plane, the metal sheet 92 has a top end 94 and a bottom end 96, both of which are bent out of the drawing plane and toward each other.

Between the top and bottom end 94, 96, the metal sheet has a recess 98, in which a small plate 102 is connected to the metal sheet 92 by a flectional beam 100. The small plate 102 can be bent into the drawing plane and out of the drawing plane by the flectional beam. If the non-return valve 72 shown in FIG. 5 is placed onto the bore 88 to the cavity 70 by way of the undersurface, which is situated opposite the bent ends 94, 96, in such a manner as shown in FIG. 4 that the small plate, as shown in FIG. 4, covers the bore 88 to the cavity 70, hydraulic fluid is able to enter the pressure chamber 44 from the cavity 70, but is not able to enter the cavity from the pressure chamber.

To produce the non-return valve 72, first of all an arbitrary metal sheet can be cut to a suitable size. In the next step, the recess 98, together with the flectional beam 100 and the small plate 102, can be machined out. To this end, the metal sheet can be punched, sawn or cut in another manner or machined. Finally, the top and bottom ends 94, 96 can be bent. In a particularly preferred manner, in this case, at least one of the two ends is bent so far that it overlaps the small plate 102 in the vertical top view onto the non-return valve 72 as shown in FIG. 5. In this way, the corresponding bent end 94, 96 serves at the same time as a defining means which defines the lift of the small plate 102 when hydraulic fluid enters into the pressure chamber 44 from the cavity 70.

Figure 6:
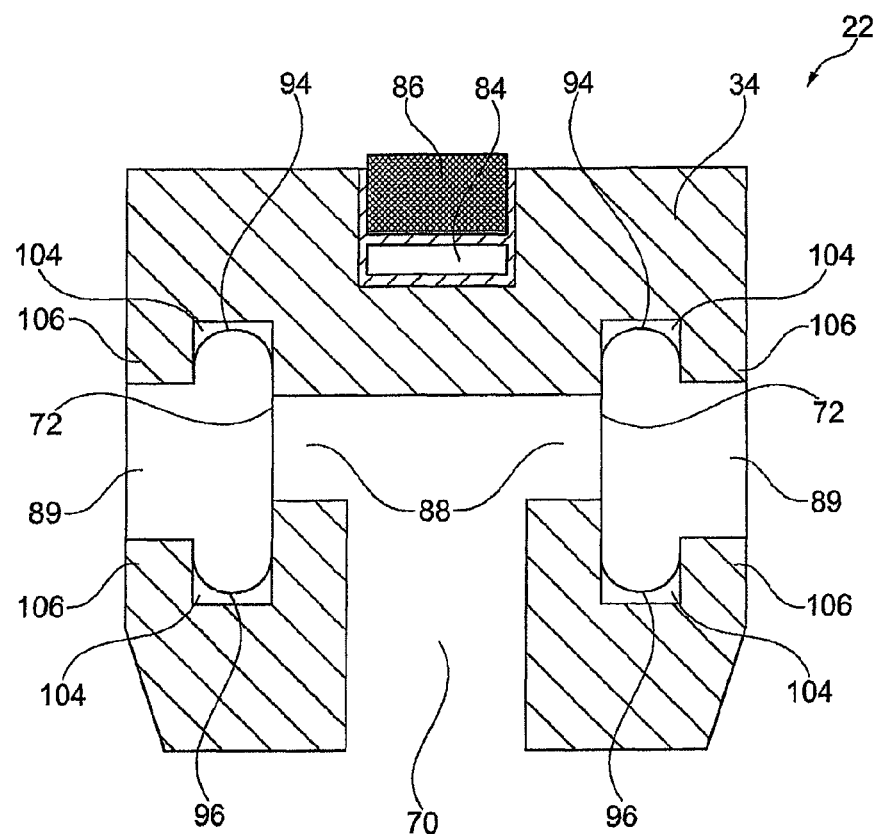
FIG. 6 shows a sectional view of an exemplary embodiment of a rotor with the non-return valve from FIG. 5.

Reference is made to FIG. 6 which shows a cross section through a vane 34 of an exemplary rotor 22, non-return valves 72, which are realized in an analogous manner to FIG. 5, are accommodated in grooves 89. The grooves 89 are realized in an analogous manner to the groove 89 in the stator 20 in FIG. 4.

As can be seen from FIG. 6, the grooves 89 have radial indentations 104, into which the bent-over ends 94, 96 are inserted. The non-return valves 72 can be pushed onto the grooves 89 by an axial opening (not shown). As an alternative to this, the non-return valves 72 can also be pushed into the grooves 89 in the circumferential direction of the rotor 22 (or of the stator 20) if the metal sheets 92 are sufficiently pliable and flexible.

Radial projections 106 result from the indentations 104. Individual projections of said radial projections 106 can extend, in a manner not shown, radially beyond the small plate 102 which covers the bores 88 to the cavity 70 and in this way can serve in addition or can serve alternatively as a lift limiter for the small plate 102.

LIST OF REFERENCE NUMBERS

2 Internal combustion engine
4 Camshaft adjustor
6 Combustion chamber
8 Valve
10 Cam
12 Camshaft
14 Lifting piston
16 Crankshaft
18 Driving means
20 Stator
22 Rotor
24 Helical spring
26 Spring cover
28 Central valve
30 Central solenoid
32 Hub
34 Vane
36 Central screw
38 Control piston
40 Plunger
42 Spring
44 Pressure chamber
46 Pressure connection
48 Volume reservoir connection
50 Ring-shaped outer part
52 Segment
54 Front cover
56 Rear cover
58 Screw
60 Axial extension
62 Groove
64 Tooth
66 Radial bore
68 Channel
70 Cavity
71 Circumferential groove
72 Non-return valve
74 Tank connection
76 Axial passage
78 Radial bore
80 Axial through-bore
82 Axial blind hole bore
84 Radial notch
86 Seal
88 Through-bore in circumferential direction
90 Axial recess
92 Metal sheet
94 Top bent end
96 Bottom bent end
98 Recess
100 Flectional beam
102 Small plate
104 Indentation
106 Projection

The invention claimed is:

1. A camshaft adjustor for an internal combustion engine, said camshaft adjustor comprising a stator, a rotor which is rotatably accommodated in the stator, a pressure chamber for adjusting the rotor in relation to the stator and a volume reservoir for equalizing a negative pressure in the pressure chamber via a channel between the pressure chamber and the volume reservoir, and a non-return valve having a closure part for blocking the channel which opens the volume reservoir into the pressure chamber in the camshaft adjustor, the non-return valve is formed of a metal sheet in which a closure part is connected to the metal sheet by a flectional beam so as to be movable in a recess of the metal sheet with two oppositely situated ends which are bent toward each other.

2. The camshaft adjustor as claimed in claim 1, wherein at least one of the two oppositely situated ends of the metal sheet covers the closure part at least in part.

3. A camshaft adjustor for an internal combustion engine, said camshaft adjustor comprising a stator, a rotor which is rotatably accommodated in the stator, a pressure chamber for adjusting the rotor in relation to the stator and a volume reservoir for equalizing a negative pressure in the pressure chamber via a channel between the pressure chamber and the volume reservoir, and a non-return valve having a closure part for blocking the channel which opens the volume reservoir into the pressure chamber in the camshaft adjustor, the non-return valve is formed of a metal sheet in which a closure part is provided so as to be movable in a recess of the metal sheet with two oppositely situated ends which are bent toward each other, wherein the rotor includes a hub and at least one vane with the channel, said vane projecting radially from the hub, wherein, on a pressure chamber side, the vane has a groove into which the channel extends and which is provided for accommodating the non-return valve.

4. A camshaft adjustor for an internal combustion engine, said camshaft adjustor comprising a stator, a rotor which is rotatably accommodated in the stator, a pressure chamber for adjusting the rotor in relation to the stator and a volume reservoir for equalizing a negative pressure in the pressure chamber via a channel between the pressure chamber and the volume reservoir, and a non-return valve having a closure part for blocking the channel which opens the volume reservoir into the pressure chamber in the camshaft adjustor, the non-return valve is formed of a metal sheet in which a closure part is provided so as to be movable in a recess of the metal sheet with two oppositely situated ends which are bent toward each other, wherein the stator includes a ring-shaped outer part and at least one vane-shaped segment with the channel, said vane-shaped segment protruding radially inward from the ring-shaped outer part, wherein, on a pressure chamber side, the segment has a groove, into which the channel extends and which is provided for accommodating the non-return valve.

* * * * *